| United States Patent [19] | [11] | 4,120,835 |
|---|---|---|
| Goodell | [45] | Oct. 17, 1978 |

[54] THERMOSETTING ACRYLIC ENAMEL CONTAINING IRON PYROPHOSPHATE

[75] Inventor: Carol Eve Goodell, Rochester, Mich.

[73] Assignee: E. I. Du Pont de Nemours and Company, Wilmington, Del.

[21] Appl. No.: 878,653

[22] Filed: Feb. 16, 1978

Related U.S. Application Data

[63] Continuation-in-part of Ser. No. 692,501, Jun. 3, 1976, abandoned.

[51] Int. Cl.² .............................................. C08L 1/14
[52] U.S. Cl. .................................. 260/15; 260/17 R; 428/460; 428/463
[58] Field of Search .......................................... 260/15

[56] References Cited

U.S. PATENT DOCUMENTS

| 3,074,895 | 1/1963 | Jackson | 106/304 |
| 3,637,546 | 1/1972 | Parker | 260/15 |
| 3,671,293 | 6/1972 | Walle | 260/15 X |

Primary Examiner—Edward M. Woodberry

[57] ABSTRACT

An improved thermosetting acrylic enamel containing a film-forming polymer blend of
(1) an acrylic polymer containing reactive carboxyl and hydroxyl groups,
(2) cellulose acetate butyrate having a 1–6 second viscosity, and
(3) a melamine formaldehyde resin at least partially alkylated with an aliphatic monohydric alcohol;

the improvement used in combination with the above comprises 0.1–5% by weight, based on the weight of the polymer blend, of iron pyrophosphate powder; this enamel forms a high quality finish on automobiles and trucks and the iron pyrophosphate provides improved gloss retention, and improved blister and darkening resistance under high temperature and humidity conditions.

8 Claims, No Drawings

THERMOSETTING ACRYLIC ENAMEL CONTAINING IRON PYROPHOSPHATE

CROSS-REFERENCE TO RELATED APPLICATIONS

This application is a continuation-in-part of application Ser. No. 692,501, filed June 3, 1976 and now abandoned.

BACKGROUND OF THE INVENTION

This invention relates to thermosetting acrylic enamels and, in particular, to an improved thermosetting acrylic enamel that gives a high quality finish that is useful for the exterior of automobile and truck bodies.

Thermosetting acrylic enamels are well known in the art as shown by Frazier et al. U.S. Pat. No. 2,681,897, issued June 22, 1954; Vasta U.S. Pat. No. 3,338,860, issued Aug. 29, 1967; Fisk et al. U.S. Pat. No. 3,365,414, issued Jan. 23, 1968; and Lowe et al. U.S. Pat. No. 3,411,941, issued Nov. 19, 1968 and are excellent for many purposes. However, as is typical of enamel compositions, spot repair of these enamels is difficult and appearance of finishes of these enamels is not of the quality of lacquer finishes.

A thermosetting acrylic enamel shown by Parker U.S. Pat. No. 3,637,546, issued Jan. 25, 1972, provides a finish that is comparable to an acrylic lacquer finish and can be spot repaired. A technique used to repair lacquer finishes can be used to repair a finish of Parker's enamel, i.e., a solvent mist is applied to soften a damaged area of the finish and a repair coating is applied and then baked and an unnoticeable repair is formed.

Finishes of Parker's enamels can be applied to automobile and truck bodies with typical automotive production equipment and have a good appearance, good gloss, and resistance to weathering, water spotting and gasoline. However, one particular problem which the automobile and truck manufacturing industry has found to be unacceptable is that these finishes, particularly finishes containing aluminum flake, when exposed to conditions of high temperature and humidity only for relatively short periods lose gloss rapidly, blister slightly and darken.

U.S. Pat. No. 3,074,895, issued Jan. 22, 1963 to Jackson, shows the use of iron pyrophosphate pigment to improve durability. However, only relatively large amounts of iron pyrophosphate were shown to be effective, in finishes other than thermosetting acrylic enamels.

SUMMARY OF THE INVENTION

An improved thermosetting acrylic enamel coating composition containing 10–60% by weight of a film-forming polymer blend and a solvent for said polymer blend in which the polymer blend consists essentially of (a) about 50–80% by weight of an acrylic polymer consisting essentially of
 (1) 0–25% by weight styrene,
 (2) 25–55% by weight methyl methacrylate,
 (3) 38–48% by weight of a soft constituent selected from the group consisting of an alkyl acrylate and an alkyl methacrylate wherein the alkyl groups have 2–12 carbon atoms,
 (4) 5–20% by weight of a hydroxy-containing constituent selected from the group consisting of a hydroxy alkyl acrylate and a hydroxy alkyl methacrylate wherein the alkyl group contains 1–8 carbon atoms, and
 (5) 1–5% by weight of an α,β-unsaturated monocarboxylic acid;

(b) about 5–50% by weight of cellulose acetate butyrate having a viscosity of 1–6 seconds; and (c) about 5–50% by weight of melamine formaldehyde resin at least partially alkylated with an aliphatic monohydric alcohol;

wherein the improvement used in combination therewith comprises:

0.1–5% by weight, based on the weight of the polymer blend, of iron pyrophosphate powder.

DESCRIPTION OF THE INVENTION

The improved enamel of this invention when exposed to conditions of high temperature and humidity retains its original gloss and does not blister or darken. Finishes from this improved enamel have a good appearance, excellent gloss and are resistant to weathering, water spotting and gasoline.

The enamel contains about 0.1–5% by weight, based on the weight of the film-forming polymer blend, of iron pyrophosphate powder of the type shown in Example 1 of U.S. Pat. No. 3,074,895. Usually, about 0.1–2% by weight of the iron pyrophosphate is used with a preferred amount being 0.2–1% by weight.

The enamel contains 10–60% by weight of the film-forming polymer blend and a solvent for the blend. Usually the enamel contains 30–50% by weight of the polymer blend and is pigmented and has a pigment volume concentration of about 1–20%.

The polymer blend of the enamel contains about (1) 50–80% by weight of the acrylic polymer, (2) 5–50% by weight of cellulose acetate butyrate and (3) 5–50% by weight of the alkylated melamine resin. One particularly useful polymer blend contains about (1) 55–70% by weight of the acrylic polymer, (2) 10–30% by weight of cellulose acetate butyrate and (3) 10–25% by weight of the alkylated melamine resin. In each case, the above constituents for the polymer blend are chosen such that the sum of (1), (2) and (3) is 100%.

The acrylic polymer contains about 0–25% by weight styrene, about 25–55% by weight methyl methacrylate, and about 38–48% of a soft constituent which is either an alkyl acrylate or an alkyl methacrylate in which the alkyl groups contain 2–12 carbon atoms. The following are typical monomers used as the soft constituent: ethyl acrylate, propyl acrylate, isopropylacrylate, butyl acrylate, isobutyl acrylate, ethyl methacrylate, propyl methacrylate, isopropyl methacrylate, butyl methacrylate, pentyl acrylate, pentyl methacrylate, hexyl acrylate, hexyl methacrylate, 2-ethyl hexyl acrylate, 2-ethyl hexyl methacrylate, nonyl acrylate, nonyl methacrylate, decyl acrylate, decyl methacrylate, lauryl acrylate, lauryl methacrylate and the like.

Butyl acrylate is a preferred soft constituent since it forms a polymer that has excellent physical properties which are particularly desirable for enamels.

The acrylic polymer also contains 5–20% by weight of a hydroxy containing compound. Typical useful hydroxy containing compounds are hydroxyalkyl acrylates or hydroxyalkyl methacrylates in which the alkyl groups contain 1–8 carbon atoms; for example, hydroxyethyl acrylate, hydroxypropyl acrylate, hydroxybutyl acrylate, hydroxyhexyl acrylate, hydroxyoctyl acrylate and the like, hydroxymethyl methacrylate, hydroxyethyl methacrylate, hydroxypropyl methacrylate, hydroxybutyl methacrylate, hydroxyhexyl methacrylate, hydroxyoctyl methacrylate and the like.

The acrylic polymer also contains about 1–5% by weight of an $\alpha,\beta$-unsaturated monocarboxylic acid. Typically useful $\alpha,\beta$-ethylenically unsaturated monocarboxylic acids used to prepare the acrylic polymer are acrylic acid, methacrylic acid, crotonic acid, ethacrylic acid, propylacrylic acid, isopropylacrylic acid and the like. Preferred are acrylic acid and methacrylic acid since these acids form a high quality polymer.

One useful acrylic polymer contains 40–50% by weight methyl methacrylate, 40–48% by weight of an alkyl acrylate, or an alkyl methacrylate, having 2–4 carbon atoms in the alkyl groups 6–10% by weight of a hydroxy alkyl acrylate or methacrylate having 2–4 carbon atoms in the alkyl group and 3–5% by weight of either acrylic acid or methacrylic acid.

One particularly useful acrylic polymer contains 40–50% by weight methyl methacrylate, 40–48% by weight butyl acrylate, 6–10% by weight hydroxyethyl acrylate and 3–5% by weight acrylic acid.

Another useful acrylic polymer which gives a high quality coating contains 10–18% by weight styrene, 25–30% by weight methyl methacrylate, 38–42% by weight butyl acrylate, 10–16% by weight hydroxyethyl acrylate and 1–3% by weight acrylic acid.

The acrylic polymer is prepared by conventional polymerization techniques in which monomers are blended with solvents and a polymerization catalyst and heated to 75°–150° C. for about 2–6 hours to form a polymer that has a relative viscosity of about 1.04–1.10 and preferably, about 1.06–1.09. The "relative viscosity" is the value obtained by dividing the efflux time of a solution of the polymer by the efflux time of the solvent used to form the above polymer solution. The efflux times are measured according to the procedure of ASTM-D-445-46-T, Method B, using as the polymer solution 0.25 grams of the polymer in 50 cubic centimeters of ethylene dichloride as the solvent. The efflux times are measured at 25° C. in a standard apparatus, sold under the designation of a modified Ostwald Viscometer.

Typical solvents and diluents which are used to prepare the acrylic polymer and the coating composition are toluene, xylene, butyl acetate, acetone, methylisobutyl ketone, methylethyl ketone, butyl alcohol, and other aliphatic, cycloaliphatic and aromatic hydrocarbons, esters, ethers, ketones, and alcohols, such as are conventionally used in coating compositions.

About 0.1–4% by weight, based on the weight of the monomers, of a polymerization catalyst is used to prepare the acrylic polymer. Typical catalysts are ditertiary butyl peroxide, cumene hydroperoxide, azobisisobutyronitrile and the like.

The cellulose acetate butyrate used in this invention has a butyryl content of about 45–55% by weight and has a viscosity of 1–6 seconds determined at 25° C. according to the method of ASTM-D-1343-56. Surprisingly, the cellulose acetate butyrate in the above amounts in the coating is miscible and compatible with the acrylic polymer and forms excellent high quality coatings and finishes.

The other constituent of the coating composition is a melamine formaldehyde resin which is at least partially alkylated with an aliphatic monohydric alcohol. This gives the composition its thermosetting characteristic and improves the composition's hardness, solvent resistance, alkali and heat resistance. Other heat reactive condensate can be used in the coating composition but the above alkylated melamine formaldehyde resins or a mixture of an alkylated melamine formaldehyde resin and urea formaldehyde are preferred. These alkylated melamine formaldehyde resins have 1–4 carbon atoms in the alkyl group and are those that are well known in the art. These resins are prepared by conventional techniques in which a lower aliphatic monohydric alcohol such as methanol, ethanol, butanol, isobutanol, propanol, isopropanol and the like is reacted with the melamine formaldehyde resin to provide pendent alkoxy group or groups. In general, melamine formaldehyde resins that are at least partially methylated and usually have 3–6 methyl groups are useful in the composition.

One preferred melamine resin used in this invention, because of its availability and since it forms a high quality coating composition, is an essentially monomeric, partially methylated melamine formaldehyde. One resin of this type has a molar ratio of melamine/formaldehyde/methanol of about 1/5/3. Another useful resin is hexa(methoxymethyl) melamine.

Sucrose benzoate can be used in the coating composition in amounts of about 2–10% by weight, based on the weight of the film-forming polymer blend of the coating composition.

Plasticizers can be used in the coating composition in amounts up to 20% by weight of the film-forming polymer blend. Usually, about 3–8% by weight of a plasticizer is used. Functional polymeric plasticizers which react with the constituents in the coating composition can be used, such as epoxidized soya bean oil, oil free and oil modified alkyds and polyesters, such as, polyorthophthalate esters, polyalkylene adipate esters or polyarylene adipate esters.

Nonfunctional monomeric plasticizers can also be used, such as butylbenzyl phthalate, dibutyl phthalate, triphenyl phosphate, 2-ethylhexylbenzyl phthalate, dicyclohexyl phthalate, dibenzyl phthalate, butylcyclohexyl phthalate, mixed benzoic acid and fatty oil acid esters of pentaerythritol, poly(propylene adipate)-dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethylhexyl ester of hexamethylene diphthalate, di(methylcyclohexyl) phthalate.

Pigments are used in the coating composition preferably, in a pigment volume concentration of about 0.3–6.0%. Examples of the great variety of pigments which are used in the coating composition are metallic oxides, preferably titanium dioxide, zinc oxide, iron oxide and the like, metal hydroxides, metal flakes such as aluminum flake, metal powders, sulfides, sulfates, carbonates, carbon black, silica, talc, china clay, iron blues, organic reds, maroons, organic dyes, lakes, and the like.

The coating compositions can be applied to a variety of substrates, for example, wood, glass, plastics, such as polypropylene, styrene, copolymers of styrene and the like, by any of the usual application methods, such as spraying, electrostatic spraying, dipping, brushing, flow coating and the like. Usually, the coating composition is applied over a suitably primed metal substrate. Typical alkyd primers or epoxy primers pigmented with iron oxide, carbon black, titanium dioxide and the like are used. Also, the novel composition can be used directly over galvanized steel to form a durable coating.

One advantage of the coating composition of this invention is that the composition can be applied directly over a primer coating without the use of an intermediate coat. However, a sealer coat or a ground coat can be used to provide coatings with excellent adhesion and smoothness. Typically useful sealer compositions are disclosed in Rohrbacher U.S. Pat. No. 3,509,086, issued Apr. 28, 1970.

After the novel coating composition is applied, the coating preferably is baked at about 125°–175° C. for about 15–30 minutes to provide a finish about 1–5 mils thick. Generally finishes are 1–3 mils thick. By the addition of conventional catalyst to the novel composition, the curing temperature can be reduced to 80°–110° C. Typical catalysts that can be used are butyl acid phosphate, paratoluene sulfonic acid and the like.

Finishes of the compositions of this invention are characterized by freedom from water spotting, excellent craze resistant, gasoline resistance in combination with outstanding durability and gloss retention. Gloss loss and blistering are substantially improved upon exposure to high temperatures and humidity in comparison to conventional acrylic enamels. Also, finishes of the composition are readily repaired by conventional techniques.

The following example is comparative. The parts and percentages are by weight unless otherwise specified.

EXAMPLE 1

The following 7 ingredients are prepared as follows:

| 1. Acrylic Polymer Solution A: | |
|---|---|
|  | Parts by Weight |
| Portion 1 | |
| Ethylene glycol monoethyl ether acetate | 11,620 |
| Hydrocarbon solvent having a boiling point of 150–190° C and an aniline point of −28° C | 18,910 |
| Butyl alcohol | 2,310 |
| Portion 2 | |
| Methyl methacrylate monomer | 23,210 |
| Butyl acrylate monomer | 22,200 |
| Hydroxy ethyl acrylate monomer | 4,200 |
| Acrylic acid monomer | 2,000 |
| Portion 3 | |
| Ditertiary-butyl-peroxide | 1,550 |
|  | 86,000 Total |

Portion 1 is charged into a polymerization vessel which is equipped with a stirrer, a thermometer, a heating element, and a reflux condenser. The mixture is heated to its reflux temperature which is about 138° C. Portions 2 and 3 are added simultaneously at a uniform rate over a 2-hour period while maintaining the resulting reaction mixture at its reflux temperature. The mixture is held at its reflux temperature for an additional 2 hours.

The resulting polymer solution has a polymer solids content of about 61% and a Gardner-Holdt viscosity of about V-$Z_1$, measured at 25° C. The resulting polymer is of the following composition: methyl methacrylate/butyl acrylate/hydroxy ethyl acrylate/acrylic acid in a weight ratio of 45/43/8/4. The polymer has an acid number of 29–32 and a relative viscosity measured as described herein of about 1.09.

| 2. White mill base: | |
|---|---|
|  | Parts by Weight |
| Portion 1 | |
| Acrylic polymer solution B (65% solids of a polymer of styrene/methyl methacrylate/butyl acrylate/hydroxy ethyl acrylate/acrylic acid in a weight ratio of 30/18.5/40/10/1.5 having a Gardner Holdt Viscosity of x-y$^{+\frac{1}{2}}$ measured at 25° C in an organic solvent) | 9.0 |
| Butyl acetate (90%) | 6.0 |
| Isopropanol | 4.0 |
| Soyalecithin solution (50% by weight in mineral spirits and xylol) | 0.5 |
| Portion 2 | |
| TiO$_2$ white pigment | 63.0 |
| Portion 3 | |
| Acrylic polymer solution B (described above) | 17.5 |
|  | 100.0 total |

Portion 1 is charged into a mixing vessel and mixed for 15 minutes. Portion 2 is added and mixed for 30 minutes and then Portion 3 is added and mixed for 30 minutes. The resulting mixture is ground 1 pass in a conventional 8-gallon sand mill unit at a rate of 30 gallons per hour.

| 3. Black mill base: | |
|---|---|
|  | Parts by Weight |
| Portion 1 | |
| Butyl acetate (90%) | 22.0 |
| Nickel octoate | 2.4 |
| Acrylic polymer solution C (60% solids of a polymer of styrene/butyl acrylate/hydroxy ethyl acrylate/acrylic acid in a weight ratio of 50/38/8/4 having a Gardner Holdt Viscosity of v-x measured at 25° C in an organic solvent) | 33.6 |
| Channel black, high color | 6.0 |
| Portion 2 | |
| Acrylic polymer solution C (described above) | 36.0 |
|  | 100.0 total |

Portion 1 is charged into a conventional ball mill and ground at a volume grind ratio of 40/70 for 43000 cycles at 38°–50° C. Portion 2 is added and the resulting mixture is ground 2000 additional cycles.

| 4. Yellow-green mill base: | |
|---|---|
|  | Parts by Weight |
| Portion 1 | |
| Acrylic polymer solution C | 14.0 |
| Butyl acetate (90%) | 12.6 |
| Isopropanol | 13.0 |
| VM and P naptha | 22.0 |
| Portion 2 | |
| Yellow-green toner pigment | 8.4 |
| Portion 3 | |
| Acrylic polymer solution C | 30.0 |
|  | 100.0 total |

Portion 1 is charged into a mixing vessel and mixed for 15 minutes. Portion 2 is added and mixed for 1 hour and then portion 3 is added and mixed for 1 hour. The resulting mixture is ground for 2 passes in a conventional sand mill unit at a rate of 30 gallons per hour.

| 5. Green mill base: | |
|---|---|
|  | Parts by Weight |
| Portion 1 | |

5. Green mill base:

| | Parts by Weight |
|---|---|
| Acrylic polymer solution C | 30.0 |
| Butyl acetate (90%) | 20.0 |
| VM and P naptha | 7.0 |
| Portion 2 | |
| Phthalocyanine green toner pigment | 9.0 |
| Portion 3 | |
| Acrylic polymer solution C | 25.0 |
| Butyl acetate (90%) | 9.0 |
| | 100.0 total |

Portion 1 is charged into a mixing vessel and mixed 15 minutes. Portion 2 is added and mixed 1 hour and then portion 3 is added and mixed 1 hour. The resulting mixture is ground 1 pass in a conventional 8-gallon sand mill at a rate of 20 gallons per hour.

6. Aluminum flake mill base:

| | Parts by Weight |
|---|---|
| Portion 1 | |
| Acrylic polymer solution B | 56.56 |
| Aluminum flake paste (65% solids aluminum flake in an organic liquid) | 22.20 |
| Portion 2 | |
| Acrylic polymer solution B | 13.32 |
| Portion 3 | |
| Butyl acetate | 4.53 |
| Isopropanol | 3.39 |
| | 100.0 total |

Portion 1 is charged into a mixer and mixed 4 hours. Portion 2 is added and mixed 5 minutes. Portion 3 is added and mixed for 1 hour.

7. Resimene 726 (partially methylated melamine resin solution, 80% solids in a 50/50 mixture of n-butanol and xylene).

An iron pyrophosphate dispersion was prepared by charging the following ingredients into a mixing vessel:

| | Parts by Weight |
|---|---|
| Toluene | 32.1 |
| Iron pyrophosphate powder (previously prepared according to Example 1 of U.S. Pat. 3,074,895) | 10.0 |
| Acrylic polymer solution A | 32.7 |
| Cellulose acetate butyrate solution (20% by weight of CAB having a viscosity of about 1.0 second and a butyryl content of 53%, 15% by weight acetone, 55%, by weight toluene and 10% by weight isopropanol) | 25.2 |
| | 100.0 total |

The above four ingredients, in the given proportions, were mixed for 10 minutes in a mixing vessel. The resulting mixture was ground for 22 minutes with sand in a metal beaker to approximate a two-pass sand mill grind.

A common mill base was formed by blending the 5 mil bases (previously prepared.) The mill bases were thoroughly mixed together in the following proportions to form the common mill base:

| | Parts by Weight |
|---|---|
| Aluminum flake mill base | 32.29 |
| Yellow-green mill base | 51.62 |
| Green mill base | 23.26 |
| White mill base | 0.16 |
| Black mill base | 0.66 |
| | 107.99 total |

The following four enamel coating compositions were each prepared by blending into a 1-gallon tin plate can the following ingredients:

| | Enamel A | Enamel B | Enamel C | Enamel D |
|---|---|---|---|---|
| | (parts by weight) | | | |
| Acrylic polymer solution A | 175.42 | 173.73 | 175.12 | 85.48 |
| Common mill base | 108.03 | 107.00 | 107.86 | 106.38 |
| Iron pyrophosphate dispersion | 0.0 | 7.81 | 1.35 | 266.91 |
| Cellulose acetate butyrate solution | 270.34 | 268.50 | 269.85 | 199.27 |
| Resimene 726 | 88.27 | 87.42 | 88.12 | 86.91 |
| Butyl benzyl phthalate | 10.84 | 10.74 | 10.83 | 10.68 |
| Toluene | 110.07 | 109.01 | 109.88 | 22.73 |
| Isopropanol | 25.03 | 24.79 | 24.99 | 24.64 |
| | 788.00 | 789.00 | 788.00 | 803.00 |
| Weight percent, iron pyrophosphate powder to binder solids | 0.0 | 0.29 | 0.05 | 10.0 |

After the ingredients were added to the can, the can was placed on a shaker and shaken for 10 minutes. Each of the above enamels was reduced to a spray viscosity using an enamel thinner and each was sprayed onto four separate phosphatized primed steel panels (total of 16 sprayed panels). The panels were previously primed with about a 0.5 mil thick layer of an alkyd resin dip primer which is cross-linked with a melamine resin. Two coated panels of each enamel were baked for 30 minutes at 138° C. (standard bake) and two coated panels of each enamel were baked for 30 minutes at 127° C. (under bake), resulting in a smooth glossy finish about 2 mils thick for each panel. The initial gloss of each of the finishes was measured. A standard-baked and an under-baked panel of each enamel were exposed to 100% humidity conditions for 24 hours over a water bath maintained at 65° C. and the remaining panels, a similar set, were exposed to 100% humidity for 24 hours over a water bath maintained at 60° C. After 24 hours, the panels were removed and the gloss and appearance of the finishes measured. After allowing the panels to stand on a rack at ambient condition for 2 hours (recovery) the gloss and appearance of each were again measured.

Test results are tabulated as follows:

Table I

| Standard Bake/65° C Water Bath | | | | |
|---|---|---|---|---|
| | Enamel A | Enamel B | Enamel C | Enamel D |
| Initial gloss at 20° | 81.5 | 81.2 | 79.4 | 76.7 |
| Gloss at 20° after 24 hours exposure | 14.0 | 76.0 | 26.0 | 43.0 |
| % Gloss loss | 82.8 | 6.4 | 67.3 | 43.9 |
| Gloss at 20° after 2-hour recovery | 42.0 | 77.5 | 56.1 | 67.0 |
| % Gloss loss | 48.5 | 4.6 | 29.3 | 12.6 |
| Appearance | Severely darkened and blistered | Acceptable | Moderate darkening and blistering | Acceptable |

Table II

Standard Bake/60° C Water Bath

| | Enamel A | Enamel B | Enamel C | Enamel D |
|---|---|---|---|---|
| Initial gloss at 20° | 81.5 | 81.8 | 78.4 | 75.1 |
| Gloss at 20° after 24-hour exposure | 65.0 | 82.0 | 79.0 | 76.0 |
| % Gloss loss | 20.2 | 0.0 | 0.0 | 0.0 |
| Gloss at 20° after 2-hour recovery | 70.0 | 81.0 | 78.2 | 75.7 |
| % Gloss loss | 14.1 | 1.0 | 0.3 | 0.0 |
| Appearance | Slightly darkened and blistered | Acceptable | Acceptable | Acceptable |

Table III

Underbake/65° C Water Bath

| | Enamel A | Enamel B | Enamel C | Enamel D |
|---|---|---|---|---|
| Initial gloss at 20° | 80.1 | 81.5 | 82.1 | 74.3 |
| Gloss at 20° after 24-hour exposure | 5.0 | 16.0 | 9.0 | 13.0 |
| % Gloss loss | 93.8 | 80.4 | 89.0 | 82.5 |
| Gloss at 20° after 2-hour recovery | 20.3 | 47.6 | 31.4 | 35.4 |
| % Gloss loss | 74.7 | 41.6 | 61.8 | 52.4 |
| Appearance | Darkened and severely blistered blistering | No discoloration, moderate blistering | No discoloration, moderate blistering | Slight darkening severe |

Table IV

Underbake/60° C Water Bath

| | Enamel A | Enamel B | Enamel C | Enamel D |
|---|---|---|---|---|
| Initial gloss at 20° | 81.9 | 81.0 | 81.3 | 75.9 |
| Gloss at 20° after 24-hour exposure | 24.0 | 77.0 | 21.0 | 39.0 |
| % Gloss loss | 70.7 | 4.9 | 74.2 | 48.6 |
| Gloss at 20° after 2-hour recovery | 59.3 | 78.2 | 55.2 | 66.7 |
| % Gloss loss | 27.6 | 3.5 | 31.7 | 12.1 |
| Appearance | no discoloration slight Blistering | Acceptable | Acceptable | Acceptable |

Enamel B, containing 0.29% by weight of iron pyrophosphate, based on the weight of the film-forming solids, is within the present invention. For purposes of comparison, Enamels A, C, and D, which are not within the present invention, were also tested. Enamel A contains no iron pyrophosphate and Enamel C contains less (0.05% by weight) than is contemplated by the present invention. Enamel D contains more iron pyrophosphate (10% by weight) than is claimed herein.

As can be seen from the tabulated results, in all situations, Enamel B finishes have greater durability than those of Enamel A and exhibit better gloss retention than either of Enamels C or D in most cases. This is particularly true for the results shown in Table I in which an accepted industry-standard bake temperature (138° C.) and 100% humidity test (exposure over a 65° C. water bath) were used. There, the gloss loss of Enamel B was only 37% that of Enamel D, 16% of Enamel C, and 9% of Enamel A.

What is claimed is:

1. An improved thermosetting acrylic enamel coating composition containing 10–60% by weight of a film-forming polymer blend and a solvent for said polymer blend in which the polymer blend consists essentially of (a) about 50–80% by weight of an acrylic polymer consisting essentially of
   (1) 0–25% by weight styrene,
   (2) 25–55% by weight methyl methacrylate,
   (3) 38–48% by weight of a soft constituent selected from the group consisting of an alkyl acrylate and an alkyl methacrylate wherein the alkyl groups have 2–12 carbon atoms,
   (4) 5–20% by weight of a hydroxy containing constituent selected from the group consisting of a hydroxy alkyl acrylate and a hydroxy alkyl methacrylate wherein the alkyl group contains 1–8 carbon atoms, and
   (5) 1–5% by weight of an $\alpha,b$-unsaturated monocarboxylic acid;

(b) about 5–50% by weight of cellulose acetate butyrate having a viscosity of 1–6 seconds; and (c) about 5–50% by weight of melamine formaldehyde resin at least partially alkylated with an aliphatic monohydric alcohol;

wherein the improvement used in combination therewith comprises:
   0.1–5% by weight based on the weight of the polymer blend, of iron pyrophosphate powder.

2. The coating composition of claim 1 which contains pigment in a pigment volume concentration of about 1 to 20% by weight and has a polymer solids content of 30–50% by weight.

3. The coating composition of claim 1 which contains up to 20% by weight, based on the weight of the film-forming polymer blend, of an organic plasticizer.

4. The coating composition of claim 1 in which the $\alpha,\beta$-ethylenically unsaturated monocarboxylic acid is selected from the group consisting of acrylic acid and methacrylic acid.

5. The coating composition of claim 4 in which the acrylic polymer consists essentially of 40–50% by weight methyl methacrylate, 40–48% by weight butyl acrylate, 6–10% by weight hydroxyethyl acrylate, 3–5% by weight acrylic acid.

6. The coating composition of claim 1 wherein said polymer blend consists essentially of (1) 55–70% by weight, based on the weight of the polymer blend, of an acrylic polymer which consists essentially of
   (a) 40–50% by weight methyl methacrylate,
   (b) 40–48% by weight of an alkyl acrylate in which the alkyl group has 2–4 carbon atoms;
   (c) 6–10% by weight of a hydroxy containing constituent selected from the group consisting of a hydroxy alkyl acrylate and a hydroxy alkyl methacrylate, wherein the alkyl groups have 2–4 carbon atoms;
   (d) 3–5% by weight of an $\alpha,\beta$-unsaturated monocarboxylic acid selected from the group consisting of acrylic acid and methacrylic acid,
   (2) 10–30% by weight of cellulose acetate butyrate having a butyryl content of about 45–55% by weight and a viscosity at 25° C. of about 1–6 seconds,
   (3) 10–25% by weight of a partially methylated melamine formaldehyde resin.

7. The coating composition of claim 6 containing 0.1–2% by weight, based on the weight of the polymer blend, of iron pyrophosphate powder.

8. The coating composition of the claim 6 containing 0.2–1% by weight, based on the weight of the polymer blend, of iron pyrophosphate powder.

* * * * *